United States Patent [19]

Matsumoto

[11] Patent Number: 5,675,455
[45] Date of Patent: Oct. 7, 1997

[54] ROTARY ACTUATOR FOR DISK DRIVE

[75] Inventor: Takashi Matsumoto, Kawasaki, Japan

[73] Assignee: Fujitsu Limited, Kawasaki, Japan

[21] Appl. No.: 539,088

[22] Filed: Oct. 4, 1995

[30] Foreign Application Priority Data

Mar. 13, 1995 [JP] Japan ................... 7-052119

[51] Int. Cl.⁶ ..................... G11B 21/12; G11B 21/02
[52] U.S. Cl. ............................. 360/106; 360/105
[58] Field of Search ...................... 360/105, 106, 360/97.01

[56] References Cited

U.S. PATENT DOCUMENTS

| | | | |
|---|---|---|---|
| 5,305,169 | 4/1994 | Anderson et al. | 360/106 |
| 5,541,792 | 7/1996 | Kinoshita et al. | 360/106 |

FOREIGN PATENT DOCUMENTS

| | | |
|---|---|---|
| 1-253878 | 10/1989 | Japan . |
| 4-67371 | 3/1991 | Japan . |
| 3-62377 | 3/1991 | Japan . |
| 3-141085 | 6/1991 | Japan . |
| 3-214476 | 9/1991 | Japan . |
| 5-198109 | 8/1993 | Japan . |
| 6-162697 | 6/1994 | Japan . |
| 6-203516 | 7/1994 | Japan . |
| 6-236645 | 8/1994 | Japan . |
| 6-251517 | 9/1994 | Japan . |

*Primary Examiner*—Robert S. Tupper
*Assistant Examiner*—David L. Ometz
*Attorney, Agent, or Firm*—Greer, Burns & Crain, Ltd.

[57] ABSTRACT

A rotary actuator for a disk drive having a base includes an actuator arm assembly rotatably mounted on the base. The actuator arm assembly has one end portion for supporting a head and another end portion for supporting a moving coil. The rotary actuator further includes a magnetic circuit having a yoke fixed to the base and a main magnet fixed to the yoke. The magnetic circuit constitutes a voice coil motor by combination with the moving coil. A retract magnet is fixed to the actuator arm assembly so as to be opposed to the yoke of the magnetic circuit. When the disk drive is stopped in operation, the retract magnet magnetically reacts with the yoke to retract the head to a CSS zone of a disk and lock the actuator arm assembly at this position.

5 Claims, 7 Drawing Sheets

ROTARY ACTUATOR FOR DISK DRIVE

BACKGROUND OF THE INVENTION

1. Field of the Invention

The present invention relates generally to a rotary actuator for a magnetic disk drive, and more particularly to a retract/lock mechanism for such a rotary actuator.

2. Description of the Related Art

In a magnetic disk drive for a computer, a contact start and stop (CSS) system is generally adopted. In this system, while a magnetic disk is being rotated at a high speed, a head flying force generated by air flow due to the high-speed rotation of the disk balances a force of suspension pressing the head on the disk, so that the head is kept at a microscopic flying height from the disk. When the rotation of the magnetic disk is stopped, the head mounted on an actuator comes into contact with a CSS zone formed at the innermost track of the magnetic disk in general, and is then positioned in the CSS zone. At this position, the actuator is locked so as to avoid moving the head from the CSS zone to a data zone by any cause such as shock.

In a magnetic disk drive for driving a magnetic disk having a diameter of 2.5 inches or more, a current is allowed to flow in a voice coil motor (VCM) by a back electromotive force generated by inertial rotation of a spindle motor, thereby retracting the head to the CSS zone. Then, at this position, the actuator is locked by a lock mechanism independently provided. However, in a compact magnetic disk drive for driving a magnetic disk having a diameter of 1.8 inches or less, it is difficult to retract the head to the CSS zone because the back electromotive force of the spindle motor is small.

The assignee of the present application has proposed an actuator retract/lock mechanism for a compact magnetic disk drive in Japanese Patent Application No. 5-343979. In this prior invention, a retract yoke is fabricated as a separate part independent of a yoke of a magnetic circuit, and the retract yoke is bonded to the yoke of the magnetic circuit. A retract magnet is mounted on a coil supporting member of an actuator. The actuator is rotated by a magnetic attraction force between the retract magnet and the retract yoke to thereby retract the head to the CSS zone. At this position, the actuator is locked by the magnetic attraction force between the retract magnet and the retract yoke.

In the above prior invention now pending, however, the retract yoke is fabricated independently of the yoke of the magnetic circuit. Accordingly, the retract yoke must be bonded to the yoke of the magnetic circuit. In bonding the retract yoke, position slippage of the retract yoke is prone to occur, where the lock position of the actuator may vary. Further, assembling the retract/lock mechanism is difficult because a jig is used to bond the retract yoke.

Further, in order to retract the head to the CSS zone to the innermost track of the disk, the retract yoke must have a structure that is inclined at a certain angle with respect to a rotational direction of the actuator. This structure requires precision, causing the fabrication cost of the retract yoke to be greatly increased. In addition, since the retract yoke is present in the magnetic circuit in the conventional structure, the retract yoke is undesirably influenced by the magnetic flux of a main magnet in the magnetic circuit.

SUMMARY OF THE INVENTION

It is therefore an object of the present invention to provide a retract/lock mechanism for an actuator in a disk drive which can suppress the influence of the magnetic flux in the magnetic circuit to reduce variations in retraction characteristics.

It is another object of the present invention to provide a retract/lock mechanism for an actuator in a disk drive which can improve the assembly of the actuator and reduce assembly cost.

In accordance with an aspect of the present invention, there is provided a rotary actuator for a disk drive having a base, comprising an actuator arm assembly rotatably mounted on the base, the actuator arm assembly having one end portion for supporting a head and another end portion for supporting a moving coil; a magnetic circuit having a yoke fixed to the base and a main magnet fixed to the yoke, the magnetic circuit constituting a voice coil motor by combination with the moving coil; and a retract magnet fixed to the actuator arm assembly so as to be opposed to the yoke of the magnetic circuit; wherein when the disk drive is stopped in operation, the retract magnet magnetically reacts with the yoke to move the head to a given zone of a disk and lock the actuator arm assembly at a lock position.

Preferably, the actuator arm assembly has an actuator block rotatably mounted on the base, and the retract magnet is fixed to the actuator block. Further, the yoke has an outer shape such that the yoke gradually approaches the retract magnet as the actuator arm assembly is rotated to move toward the lock position.

As described above, the yoke of the magnetic circuit has an outer shape such that the yoke gradually approaches the retract magnet fixed to the actuator block as the actuator arm assembly is rotated to move toward the lock position. Accordingly, when the disk drive is stopped in operation, the actuator arm assembly is retracted to the lock position by a magnetic attraction force between the retract magnet and the yoke of the magnetic circuit, and is then locked at this position.

According to the present invention, the need for specially providing a retract yoke can be eliminated, and the yoke of the magnetic circuit can be used also as the yoke for retraction of the head. Accordingly, the assemblability can be improved and the cost can be reduced. Further, since the direction of magnetic flux formed between the retract magnet and the yoke is substantially perpendicular to the direction of magnetic flux in the magnetic circuit, the retract/lock mechanism is less influenced by the magnetic flux in the magnetic circuit in retracting the head.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
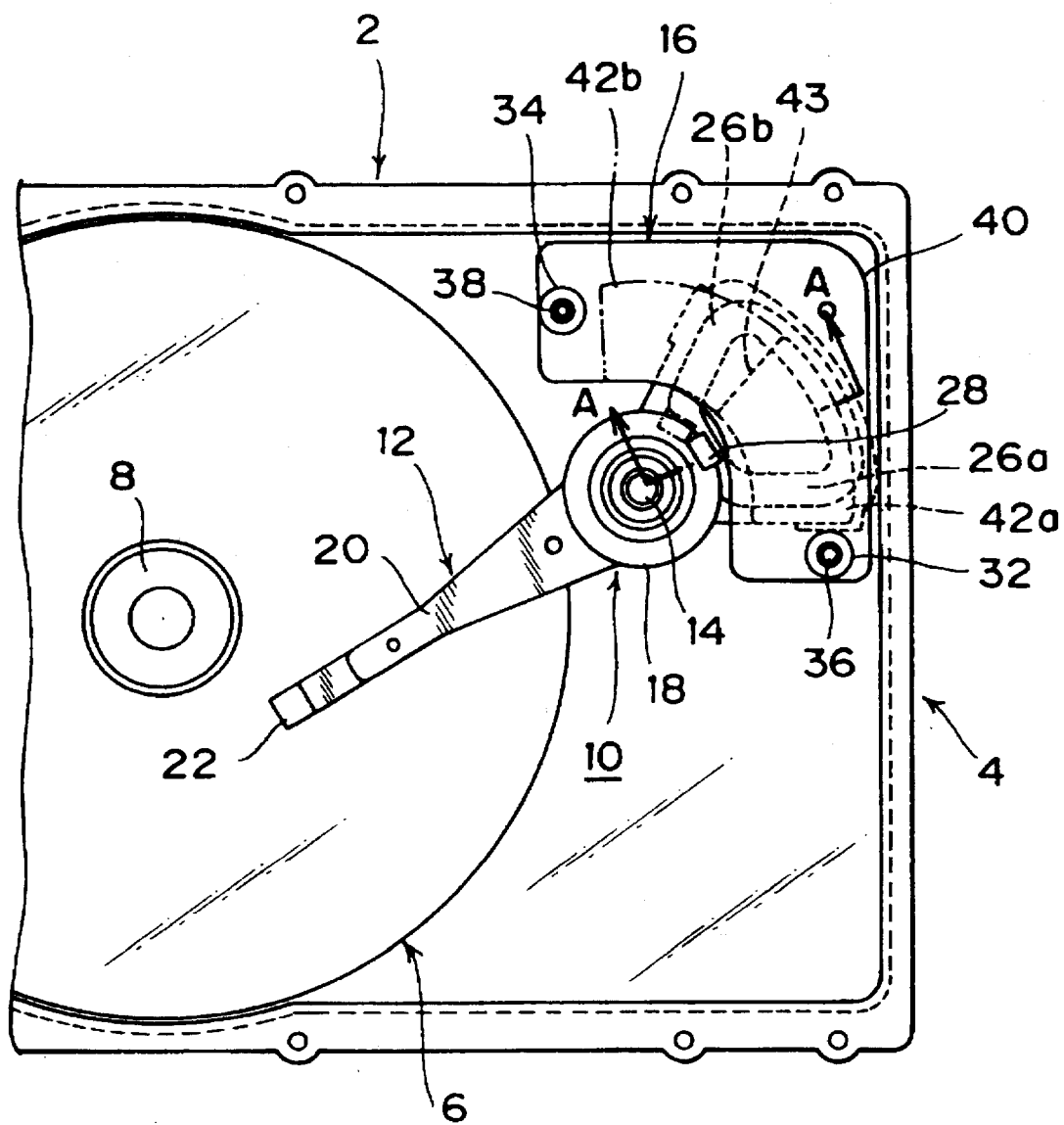
FIG. 1 and in the direction generally indicated is a partially cutaway, plan view of a first preferred embodiment of the present invention.

Referring to FIG. 1, there is shown a partially cutaway, plan view of a magnetic disk drive having a retract/lock mechanism according to a first preferred embodiment of the present invention. Reference numeral 2 denotes a housing (disk enclosure) composed of a base 4 and a cover 5 (see FIG. 3). A plurality of magnetic disks 6 to be rotationally driven by a spindle motor assembly 8 are contained in the housing 2.

Figure 2:
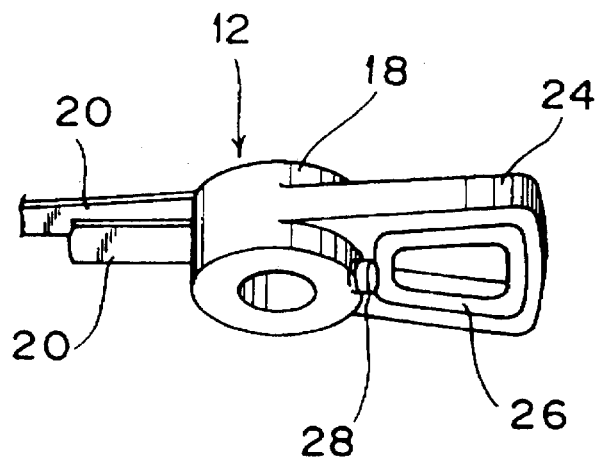
FIG. 2 is a perspective view of an actuator block and its peripheral portion.

Reference numeral 10 denotes a rotary actuator composed of an actuator arm assembly 12 and a magnetic circuit 16. The actuator arm assembly 12 is rotatably mounted on a shaft 14 fixed to the base 4. As best shown in FIG. 2, the actuator arm assembly 12 includes an actuator block 18 rotatably mounted on the shaft 14, two arms 20 extending from the actuator block 18 in one direction, and a coil supporting member 24 extending from the actuator block 18 in a direction opposite to the direction of extension of the arms 20.

A plurality of magnetic heads 22 for reading and/or writing data on the magnetic disks 6 are mounted on the arms 20 at their front ends. A flat coil type of moving coil 26 is mounted on the coil supporting member 24. The moving coil 26 has a first effective portion 26a and a second effective portion 26b both perpendicular to the axis of rotation of the actuator arm assembly 12 (i.e., the axis of the shaft 14). The actuator block 18 has a hole opposed to the magnetic circuit 16, and a retract magnet 28 is inserted in this hole and bonded therein.

Figure 3:
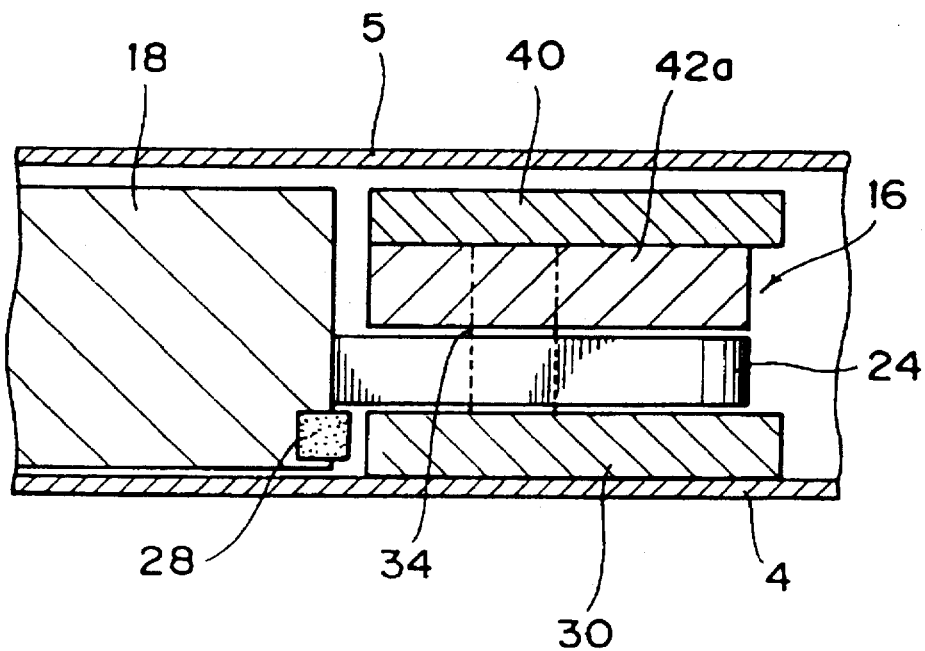
FIG. 3 is a cross section taken along the line A—A in FIG. 1.

Referring to FIGS. 1 and 3, the magnetic circuit 16 includes a lower yoke 30 fixed to the base 4. An upper yoke 40 is fixed to the lower yoke 30 by screws 36 and 38 so as to be vertically spaced a given distance by an inner stopper 32 and an outer stopper 34. While the inner stopper 32 and the outer stopper 34 originally serve to stop rotation of the actuator arm assembly 12 respectively near an innermost cylinder and an outermost cylinder of the magnetic disks 6, these stoppers 32 and 34 serve also as spacers for spacing the upper yoke 40 from the lower yoke 30 as mentioned above. A main magnet 42 is bonded to the lower surface of the upper yoke 40. The main magnet 42 is divided at its central position 43 in a seek direction or rotational direction of the actuator arm assembly 12 into a first magnet 42a and a second magnet 42b contacting with each other at the central position 43. The first and second magnets 42a and 42b have magnetic poles at their upper and lower portions, and the magnetic poles of the first and second magnets 42a and 42b are magnetized so that the polarities of the magnetic poles of the first magnet 42a are opposite to those of the magnetic poles of the second magnet 42b with respect to the central position 43.

Figure 4:
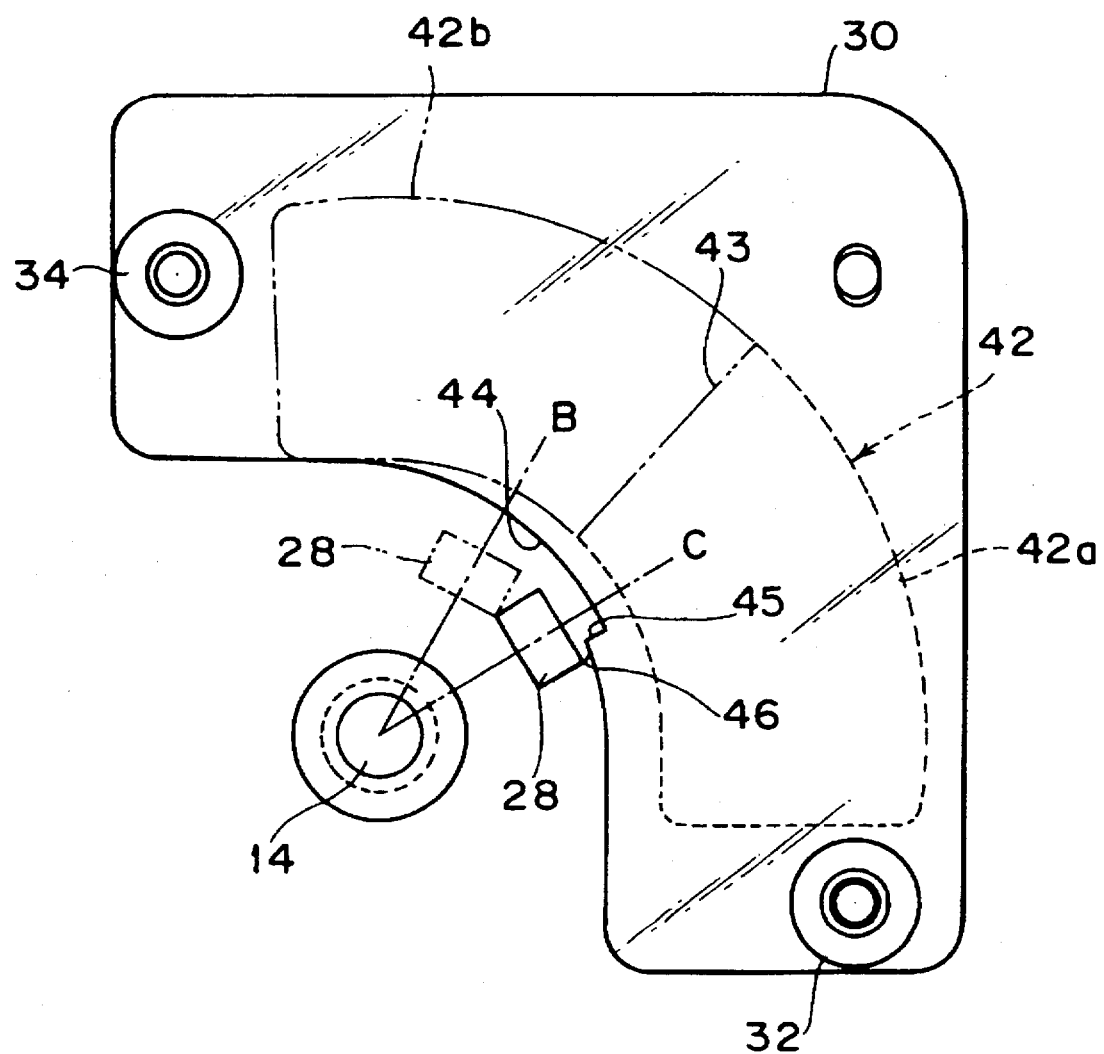
FIG. 4 is a plan view of a lower yoke.

FIG. 4 shows a plan view of the lower yoke 30, in which the main magnet 42 fixed to the upper yoke 40 is shown by a phantom line for the convenience of description. The lower yoke 30 has an arcuate inner circumferential surface 44 curved in such a manner that the distance between the arcuate inner circumferential surface 44 and the retract magnet 28 is gradually reduced as the heads 22 mounted on the front ends of the arms 20 are moved toward the innermost cylinder of the disks 6. In FIG. 4, the retract magnet 28 at a lock position C where the magnetic disk drive is inoperative is shown by a solid line, and the retract magnet 28 at a position B where the magnetic disk drive is in operation is shown by a phantom line.

A projection 46 is formed on the inner circumference of the lower yoke 30 so as to partially overlap the retract magnet 28 rotated to the lock position C. A step 45 is formed between the projection 46 and the arcuate inner circumferential surface 44, so as to define a very small distance between the retract magnet 28 at the lock position C and the projection 46 of the lower yoke 30. Accordingly, a large magnetic attraction force between the retract magnet 28 at the lock position C and the projection 46 of the lower yoke 30 is obtained to thereby lock the actuator arm assembly 12 at this lock position C.

Figure 6:
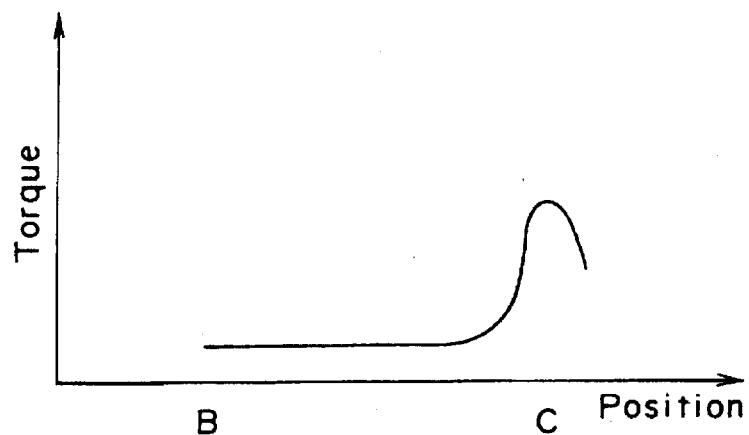
FIG. 6 is a graph showing the relation between actuator position and retract torque.
Figure 7:
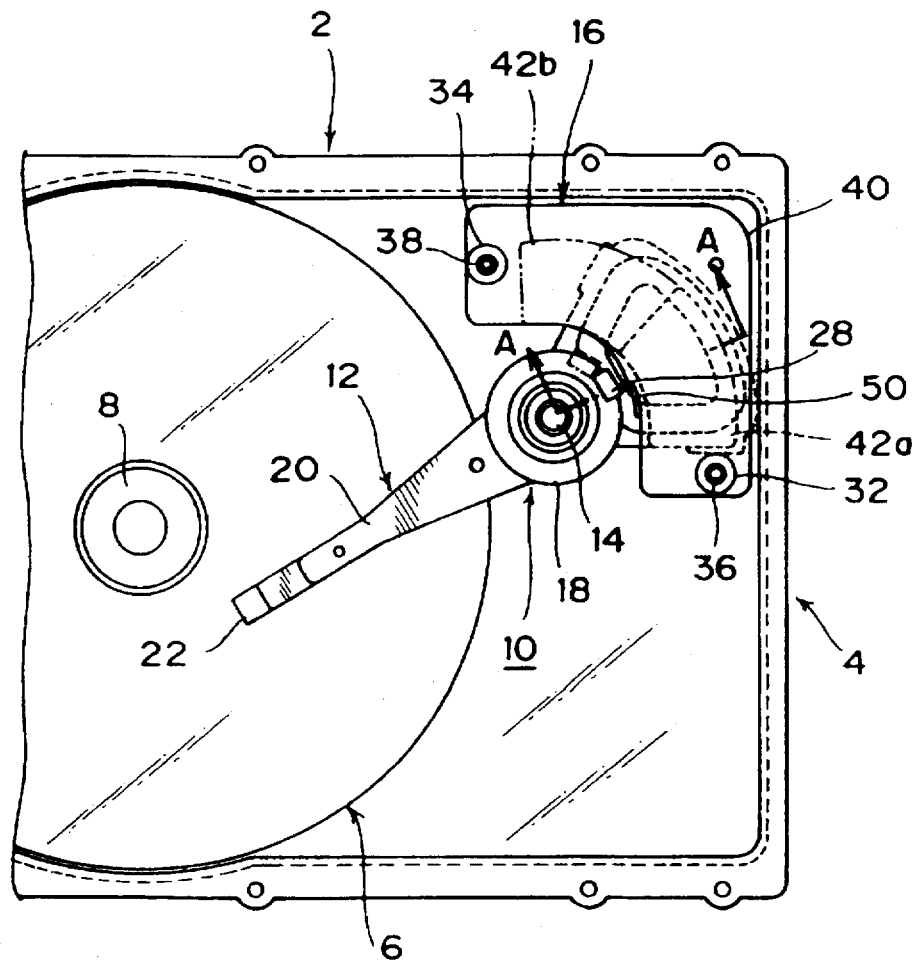
FIG. 7 and in the direction generally indicated is a partially cutaway, plan view of a second preferred embodiment of the present invention.
Figure 8:
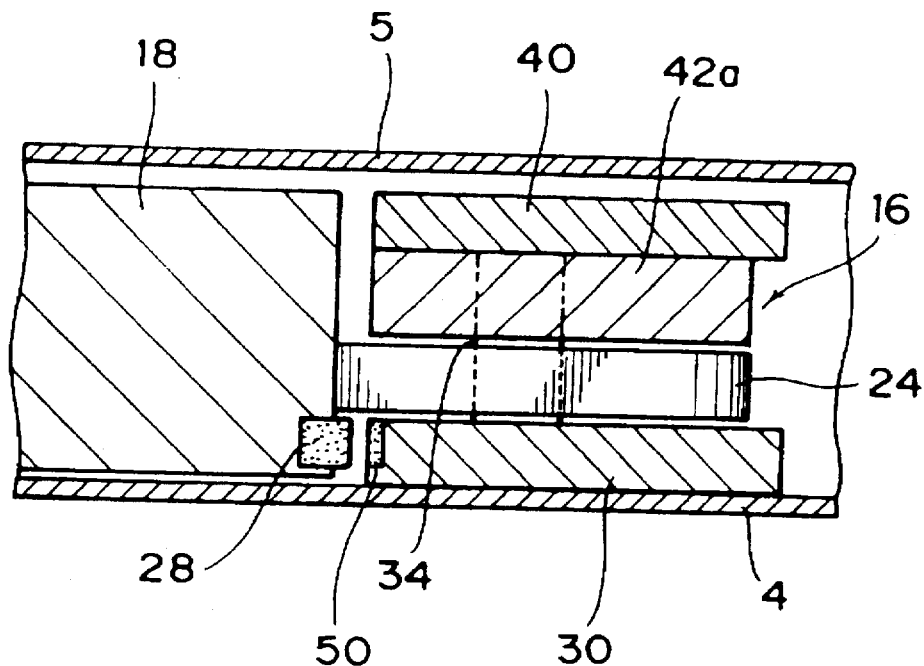
FIG. 8 is a cross section taken along the line A—A in FIG. 7.
Figure 9:
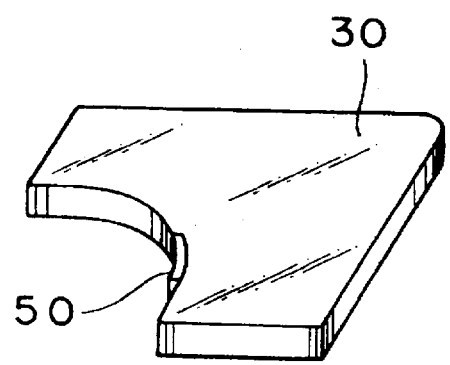
FIG. 9 is a perspective view of a lower yoke in the second preferred embodiment.

As shown in FIG. 6, a retract torque at the lock position C is much larger than that at the position B. Such a large retract torque allows the actuator arm assembly 12 to be effectively locked at the position C. The retract torque herein implies the torque of rotating the actuator arm assembly 12 toward the innermost cylinder of the disks 6.

Figure 5:
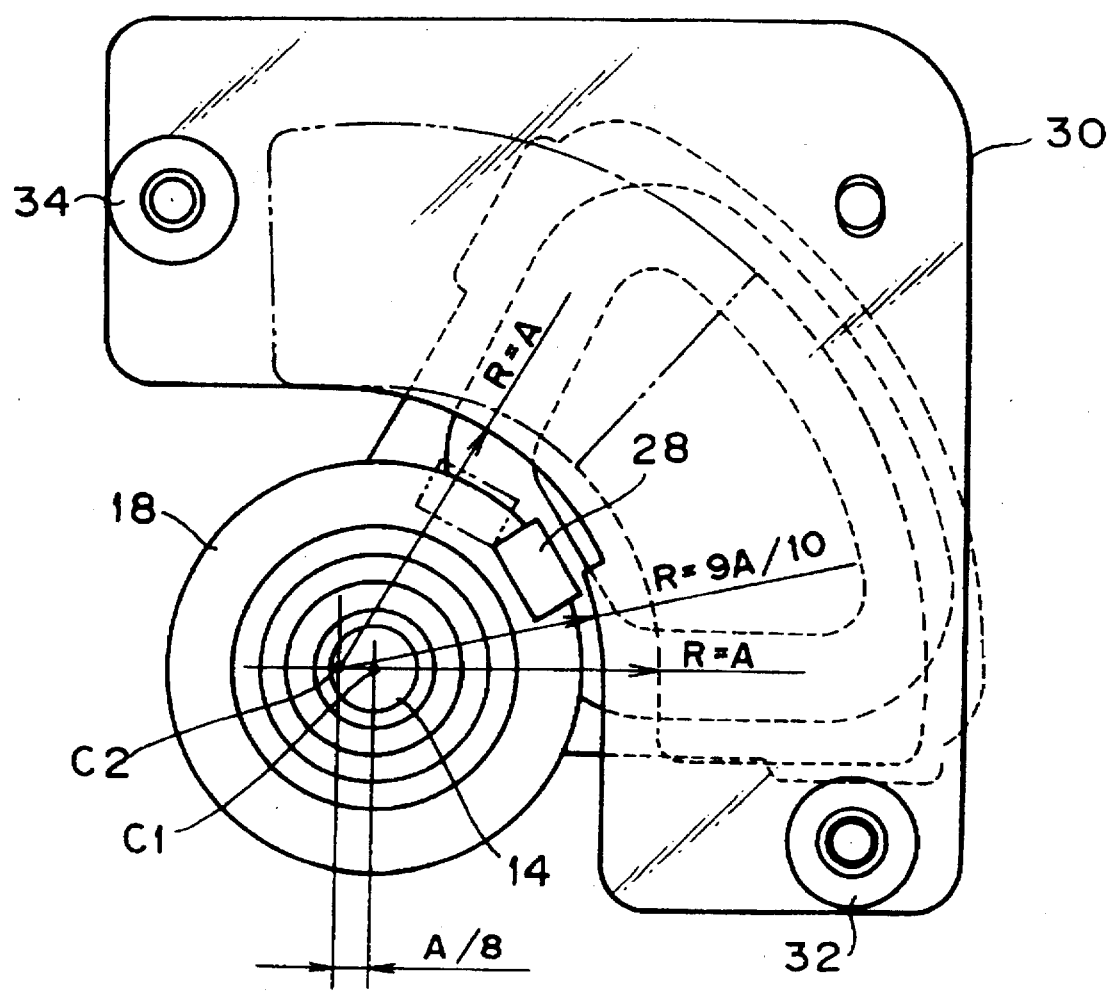
FIG. 5 is a plan view illustrating a dimensional relation between the lower yoke and the actuator block.

FIG. 5 shows a dimensional relation between the lower yoke 30 and the actuator block 18 in this preferred embodiment. Assuming that the inner circumferential surface of the main magnet 42 fixed to the upper yoke 40 is formed as an arcuate surface with a radius R=A about the center C1 of the actuator block 18, the arcuate inner circumferential surface 44 of the lower yoke 30 is formed as an arcuate surface with a radius R=A about a point C2 horizontally offset by A/8 from the center C1 of the actuator block 18, and the inner circumferential surface of the projection 46 is formed as an arcuate surface with a radius R=9A/10 about the point C2.

A retract/lock mechanism according to a second preferred embodiment of the present invention will now be described with reference to FIGS. 7 to 11. In the following description of the second preferred embodiment, substantially the same parts as those of the first preferred embodiment mentioned above will be denoted by the same reference numerals, and the description thereof will be omitted to avoid repetition.

Figure 10:
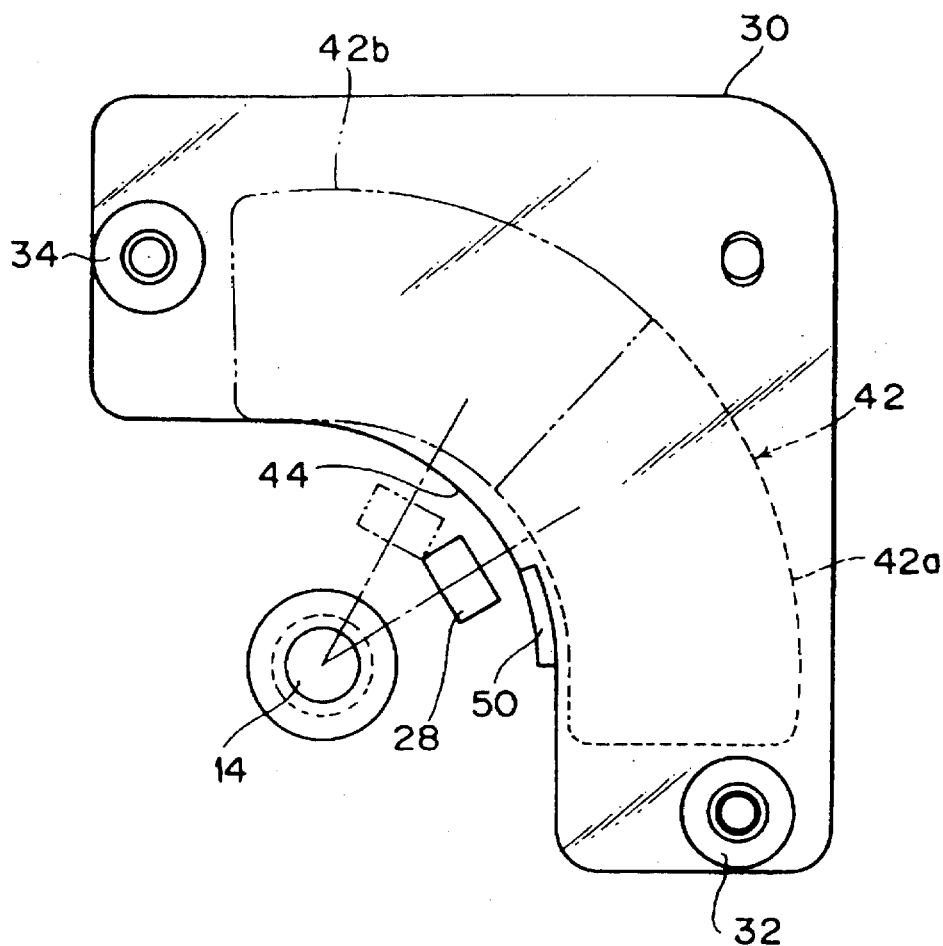
FIG. 10 is a plan view of the lower yoke in the second preferred embodiment.

The second preferred embodiment is similar to the first preferred embodiment except the lock mechanism only. As best shown in FIG. 10, a lock magnet 50 is bonded to the inner circumferential surface of the lower yoke 30 at the lock position C of a retract magnet 28 where it partially overlaps the lock magnet 50. Accordingly, the actuator arm assembly 12 is locked at this position C by a strong magnetic attraction force between the retract magnet 28 and the lock magnet 50.

Figure 11:
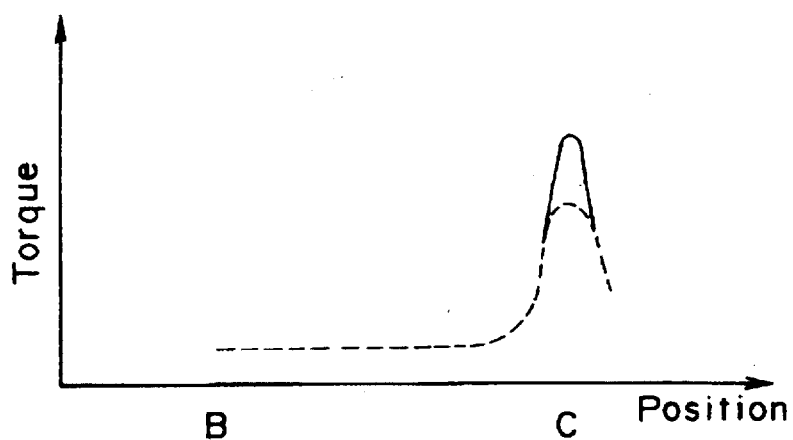
FIG. 11 is a graph showing the relation between actuator position and retract torque in the second preferred embodiment.

FIG. 11 shows the relation between retract torque and position of the actuator arm assembly 12 in the second preferred embodiment. As apparent from FIG. 11, the retract torque at the lock position C is very large as shown by a solid line, thereby strongly locking the actuator arm assembly 12 at the lock position C. For comparison, the retract torque in the first preferred embodiment is shown by a broken line in FIG. 11.

According to the present invention, the yoke of the magnetic circuit is used also as a retract yoke, so that it is possible to provide a retract/lock mechanism for a rotary actuator which can be improved in assemblability and can achieve a cost reduction. Further, the retract/lock mechanism of the present invention is hardly influenced by the magnetic flux in the magnetic circuit to thereby reduce variations in retraction characteristics.

What is claimed is:

1. A rotary actuator for a disk drive having a base and at least one disk, comprising:
    an actuator arm assembly rotatably mounted on the base, said actuator arm assembly having one end portion for supporting a head and another end portion for supporting a moving coil;
    a magnetic circuit having a yoke fixed to the base and a main magnet fixed to said yoke, said magnetic circuit and said moving coil constituting a voice coil motor; and
    a retract magnet fixed to said actuator arm assembly so as to be opposed to said yoke of said magnetic circuit, wherein said yoke has a shape such that a radially extending gap is defined between said retract magnet and said yoke, and said radially extending gap gradually becomes smaller as said actuator arm assembly gradually approaches a lock position, whereby a magnetic attraction force between said retract magnet and said yoke gradually increases as said radially extending gap gradually becomes smaller;
    wherein when the disk drive is stopped in operation, said retract magnet magnetically reacts with said yoke to move said head to a given zone on the at least one disk and locks said actuator arm assembly at said lock position.

2. A rotary actuator for a disk drive according to claim 1, wherein said actuator arm assembly has an actuator block rotatably mounted on the base, and said retract magnet is fixed to said actuator block.

3. A rotary actuator for a disk drive according to claim 1, wherein:
    said yoke comprises a lower yoke fixed to the base and an upper yoke fixed to said lower yoke so as to be vertically spaced a given distance from said lower yoke;
    said main magnet is fixed to at least one of an upper surface of said lower yoke and a lower surface of said upper yoke, said main magnet comprising a first magnet and a second magnet each having upper and lower magnetic poles magnetized so that polarities of said upper and lower magnetic poles of said first magnet are opposite to polarities of said upper and lower magnetic poles of said second magnet with respect to a central position of said main magnet in a rotational direction of said actuator arm assembly; and
    said moving coil is of a flat coil type having a first effective portion and a second effective portion both perpendicular to an axis of rotation of said actuator arm assembly.

4. A rotary actuator for a disk drive according to claim 1, wherein said yoke has a projection in proximity to said retract magnet when said actuator arm assembly is moved to said lock position.

5. A rotary actuator for a disk drive according to claim 1, further comprising a lock magnet fixed to said yoke, said lock magnet magnetically attracting said retract magnet to lock said actuator arm assembly when said actuator arm assembly is moved to said lock position.

* * * * *